(12) United States Patent
De Wilde

(10) Patent No.: US 7,106,182 B2
(45) Date of Patent: Sep. 12, 2006

(54) SIMPLIFIED TRUCK TRACTOR SOCKET WIRING

(75) Inventor: Eric D. De Wilde, Anaheim, CA (US)

(73) Assignee: R.A. Phillips Industries, Inc., Sante Fe Springs, CA (US)

( * ) Notice: Subject to any disclaimer, the term of this patent is extended or adjusted under 35 U.S.C. 154(b) by 236 days.

(21) Appl. No.: 10/757,054

(22) Filed: Jan. 14, 2004

(65) Prior Publication Data

US 2005/0168327 A1  Aug. 4, 2005

Related U.S. Application Data

(60) Provisional application No. 60/439,933, filed on Jan. 14, 2003.

(51) Int. Cl.
| | |
|---|---|
| *G08B 21/00* | (2006.01) |
| *B60Q 1/52* | (2006.01) |
| *B60D 1/62* | (2006.01) |
| *B60R 21/16* | (2006.01) |
| *B60L 1/00* | (2006.01) |
| *B60L 1/14* | (2006.01) |

(52) U.S. Cl. .................. 340/431; 340/686; 340/687; 340/471; 340/825.06; 280/422; 280/446.1; 280/734; 280/735; 307/9.1; 307/10.1; 307/10.8

(58) Field of Classification Search ............... 340/431, 340/471, 686, 687; 307/9.1, 10.1, 10.8; 280/422, 280/446.1, 734–735
See application file for complete search history.

(56) References Cited

U.S. PATENT DOCUMENTS

| | | | | |
|---|---|---|---|---|
| 3,751,060 | A * | 8/1973 | Holmberg et al. | 280/402 |
| 4,857,807 | A * | 8/1989 | Hargis | 315/77 |
| 5,080,594 | A * | 1/1992 | Swinford | 439/35 |
| 5,397,924 | A * | 3/1995 | Gee et al. | 307/9.1 |
| 5,604,439 | A * | 2/1997 | Walkington et al. | 324/504 |
| 5,775,712 | A * | 7/1998 | Link et al. | 280/422 |

\* cited by examiner

*Primary Examiner*—Jeffery Hofsass
*Assistant Examiner*—Lam Pham
(74) *Attorney, Agent, or Firm*—Christie, Parker & Hale, LLP

(57) ABSTRACT

A power distribution unit useful in a truck tractor to apply electrical power to a selected one or more of a plurality of signal terminals of a tractor-mounted connector in a tractor-to-trailer electrical connection. The power distribution unit comprises a power bus adapted for connection to a power source, an output terminal corresponding to each signal terminal of the connector, a switch connected between each output terminal and the power bus, and an actuator associated with each switch and operable upon receipt of a respective control signal to operate the associated switch.

14 Claims, 5 Drawing Sheets

SIMPLIFIED TRUCK TRACTOR SOCKET WIRING

CROSS REFERENCE TO RELATED APPLICATION

This application claims the benefit of U.S. provisional patent application No. 60/439,933 filed Jan. 14, 2003.

FIELD OF THE INVENTION

This invention pertains to electrical connections between heavy duty truck tractors and trailers connected to such tractors. More particularly, this invention pertains to a switching unit located in the tractor, preferably in close proximity to an electrical connection socket mounted in a rear portion of a heavy duty truck tractor, which is effective to apply electrical power from the tractor battery to a socket terminal when that terminal is to be energized to supply a voltage at the terminal.

BACKGROUND OF THE INVENTION

The general specifications for the number of electrical conductors between heavy duty truck tractors and trailers operated in the United States and Canada long have been governed by Society of Automotive Engineers (SAE) Standard J560 ("SAE J560"), the current version of which is incorporated herein by reference. SAE J560 also governs the arrangement and sizing of terminals of connectors (plugs and sockets) for tractor-trailer electrical connections, and also the basic geometries of those connectors. The objective of SAE J560 is to assure the electrical interconnectibility, without the use of adapters, of any truck trailer to any truck tractor. Other SAE standards address that interconnectibility objective in the context of mechanical and pneumatic connections between truck tractors and trailers. In other parts of the world, standards having the same objective, but different specifics, are applicable.

The SAE J560 connectors used to make electrical connections between truck tractors and trailers are sockets and plugs. The sockets most commonly are mounted to the opposing faces of tractors and trailers. The plugs are carried at the opposite ends of tractor-trailer interconnection cables. Sockets typically are mounted in holes formed in the rear walls of tractor cabs and in the front end walls of trailers, so that a portion of the socket is outside the vehicle and a portion of the socket is inside the vehicle. Generally, the front of the socket is outside the vehicle and the rear or back of the socket is inside the vehicle.

In tractors currently produced, the electrical connections to a mounted SAE J560 socket are complex and involved. Those connections typically are made by use of one or more multi conductor harnesses, one end of which can be a socket that mates with the terminals extending from the rear of the mounted J560 socket. The harness conductors extend from that harness end socket to various places in the tractor, such as to the battery, and to function switches and controllers, which in turn are connected to the battery. Some of these harness conductors are part of extensive circuits which include long conductors and many connectors. The result is that the power applied to the SAE J560 socket terminals frequently has a voltage less than the desired full battery voltage. The problem of low SAE J560 tractor socket terminal voltage is a problem shared by tractor manufacturers.

SUMMARY OF THE INVENTION

This invention addresses the problem of low tractor socket terminal voltage, and particularly low terminal voltage due to extensive circuitry within the tractor. This problem is addressed by providing an improved arrangement for providing power to the terminals of a tractor SAE J560 socket, for example. The new arrangement includes a power distribution unit in the form of a switching controller to which direct battery connections can be made and to which the terminals on the interior portion of a J560 socket can be directly connected. The controller includes a relay for each of the six functional (non-common) signal terminals of the J560 socket. Each relay has input and output power connections to which the battery and the respective J560 socket terminal can be connected. Command signals for operating those relays can be obtained from two sources. Relay command or control signals can be obtained from switches or controllers located elsewhere in the tractor, such as a trailer running light ON/OFF switch on the tractor dashboard. Relay control signals can also be obtained for some or all of the relays from a multiplex signal bus if such a bus is available and is used in the tractor. As the contacts of each relay are closed, full battery power is supplied from the relay output power connection to the relevant signal terminal of a J560 socket mated to or otherwise connected to the controller. The relay control signals can be low voltage signals compared to full battery voltage.

As a result, the internal wiring of a tractor can be greatly simplified. The power connections to the switching controller are provided by positive and negative conductors directly from the battery. If a tractor manufacturer elects to mount plural SAE J560 sockets to a tractor, each such socket can be, and preferably is, associated with its own switching controller according to this invention.

The present invention relates to a power distribution unit useful in a truck tractor to apply electrical power to a selected one or more of a plurality of signal terminals of a tractor-mounted connector in a tractor-to-trailer electrical connection. The power distribution unit can comprise a power bus adapted for connection to a power source and an output terminal corresponding to each signal terminal of the connector. Further, the power distribution unit may also comprise a switch connected between each output terminal and the power bus, and an actuator associated with each switch, the actuator being operable upon receipt of a respective control signal to operate the associated switch.

BRIEF DESCRIPTION OF THE DRAWINGS

The above-mentioned and other aspects of the invention are set forth in greater detail in the accompanying drawings of presently preferred and other embodiments or implementations of the invention, and in which.

DETAILED DESCRIPTION

Figure 1:
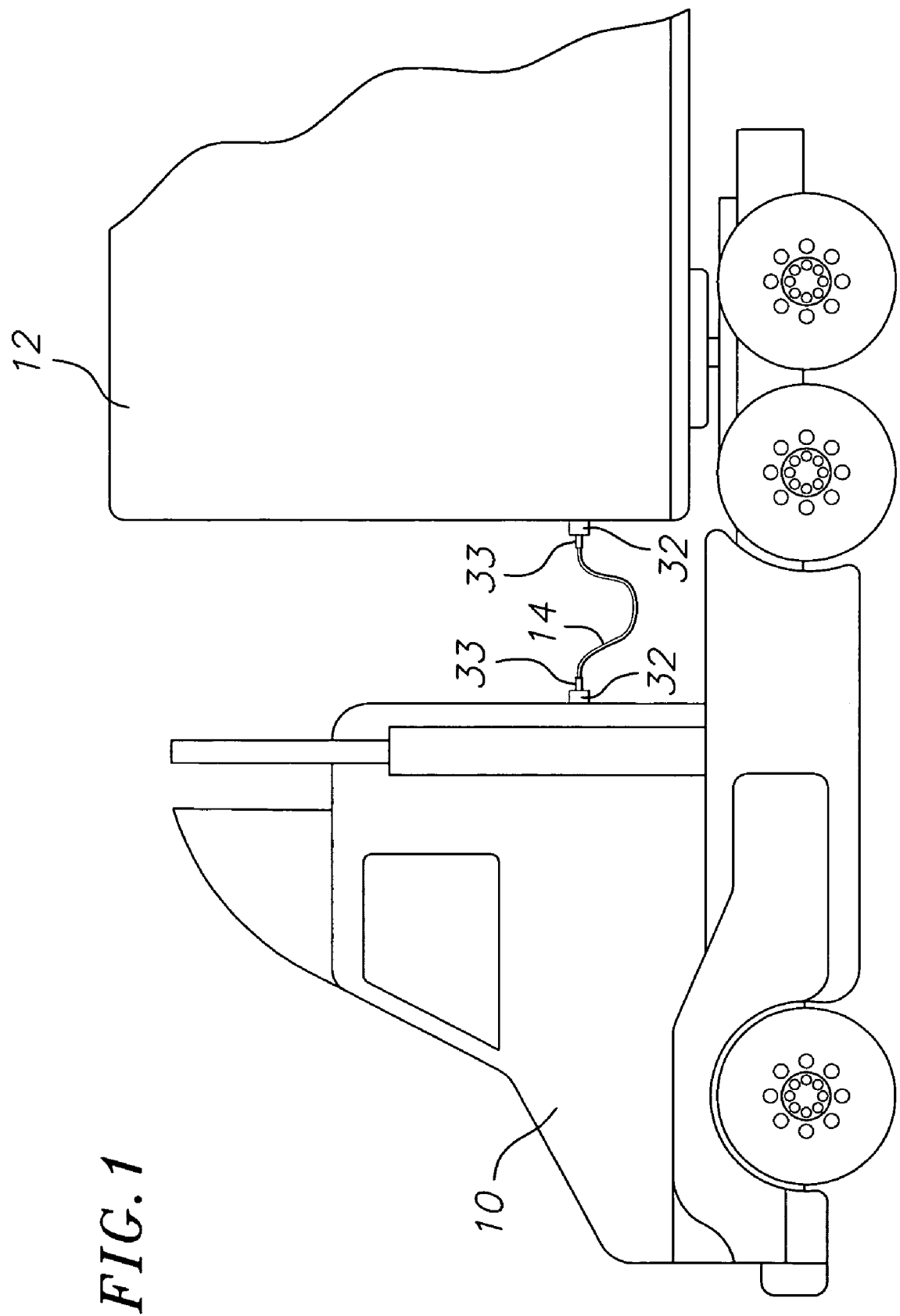
FIG. 1 is a schematic view of electrical wires connected between a truck tractor and a trailer.

The present invention relates to an improved arrangement for providing power to the terminals of a truck tractor socket which preferably conforms to SAE J560 or another applicable standard. As shown in FIG. 1, a tractor 10 may be in electrical communication with a trailer 12 by means of a cable 14 connecting the tractor to the trailer. As noted above, the cable 14 may include multiple conductors connected to respective terminals of plugs 33 at each end of the cable. The plugs 33 are matable in sockets 32 mounted, preferably, in openings in the opposing faces of the tractor 12 and the trailer 14. If, as preferred, the sockets 32 conform to SAE J560, plugs 33 also should conform to that standard.

Figure 4:
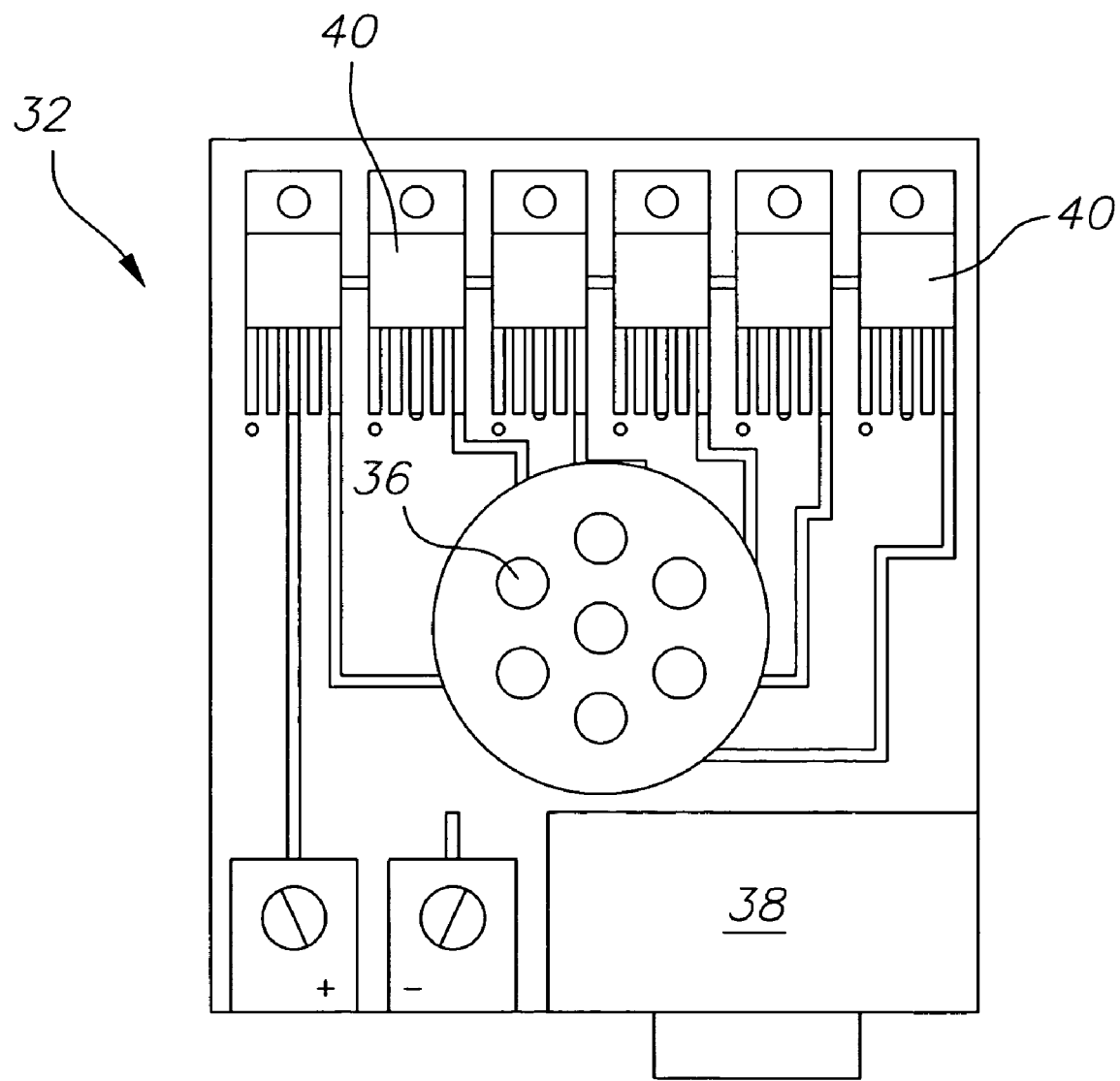
FIG. 4 is a schematic view of another embodiment of the present invention.
Figure 5:
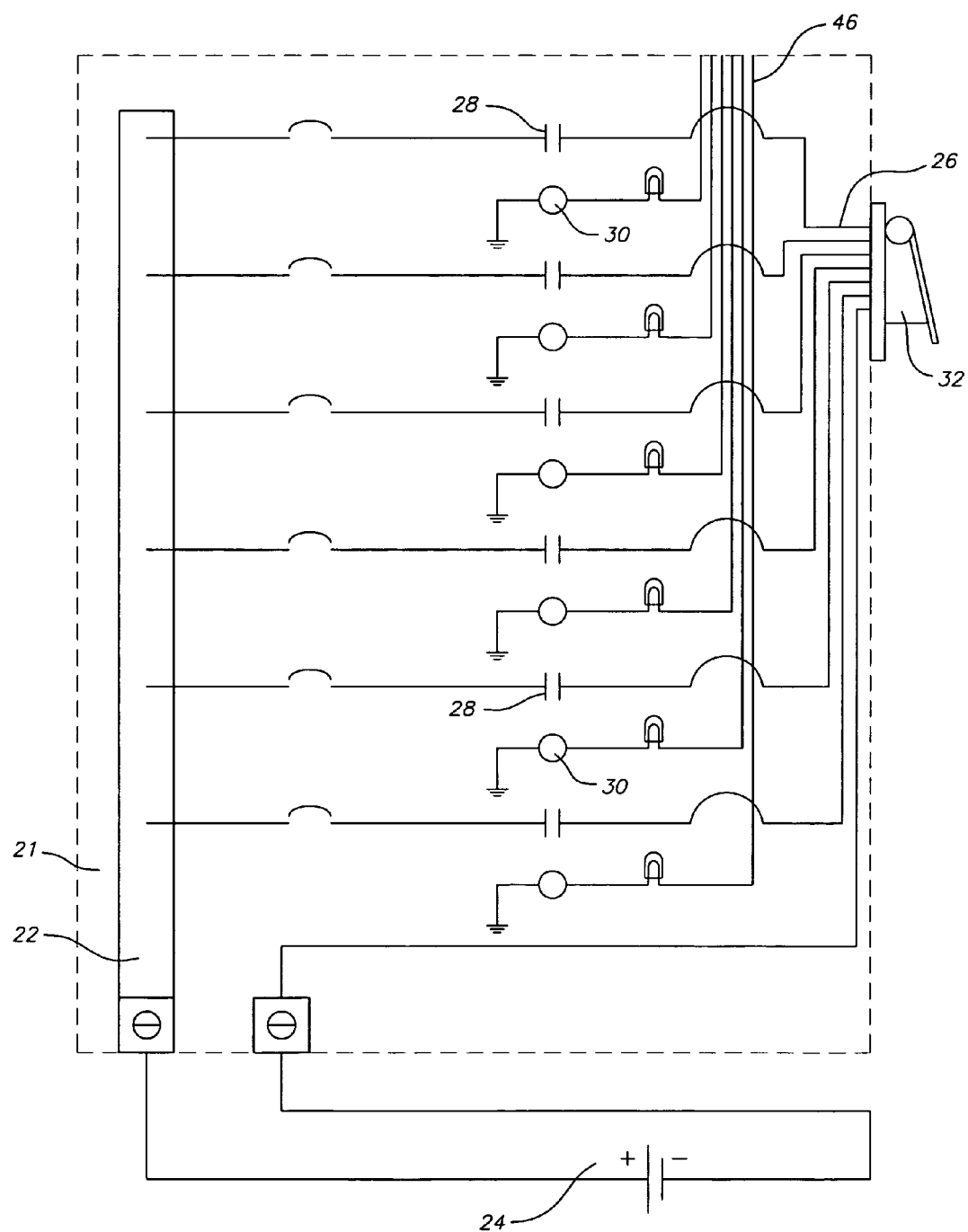
FIG. 5 is a schematic view of a further embodiment of the present invention.

A power distribution unit 20 of the present invention, as shown schematically in FIG. 5, comprises a housing 21 which includes a power bus 22 adapted for connection to a power source 24. The power source 24 may be a battery, but the power source may also be any other acceptable means of supplying an adequate amount of power of the desired kind, preferably DC power. The power distribution unit 20 may further comprise at least one output terminal 26 and a corresponding switch 28. In a preferred arrangement, the power distribution unit 20 may include one output terminal 26 and accompanying switch 28 corresponding to each signal terminal of the socket 32. Additionally, the power distribution unit may comprise an actuator 30 associated with each switch 28. In one arrangement, the actuator 30 may be a coil of a relay solenoid. In another arrangement, each switch 28 and associated actuator 30 together may comprise a relay operable by a respective command or control signal. Together, the switch and actuator combinations form a bank of relays 40 (FIG. 4). Each relay 40 can be an electromechanical device including a solenoid having a coil to which a command signal is applied. More preferably, however, each relay is a solid state electronic device having the equivalent of a coil.

As an example, a J560 socket includes seven terminals. Six of these terminals have functionalities assigned to them by SAE J560. Those six terminals can be said to be socket signal terminals, as opposed to the seventh terminal, which is a common terminal provided as a return path to electrical ground in the tractor (e.g., the tractor battery negative terminal) from the several trailer circuits to which power is supplied via the socket signal terminals.

Figure 3:
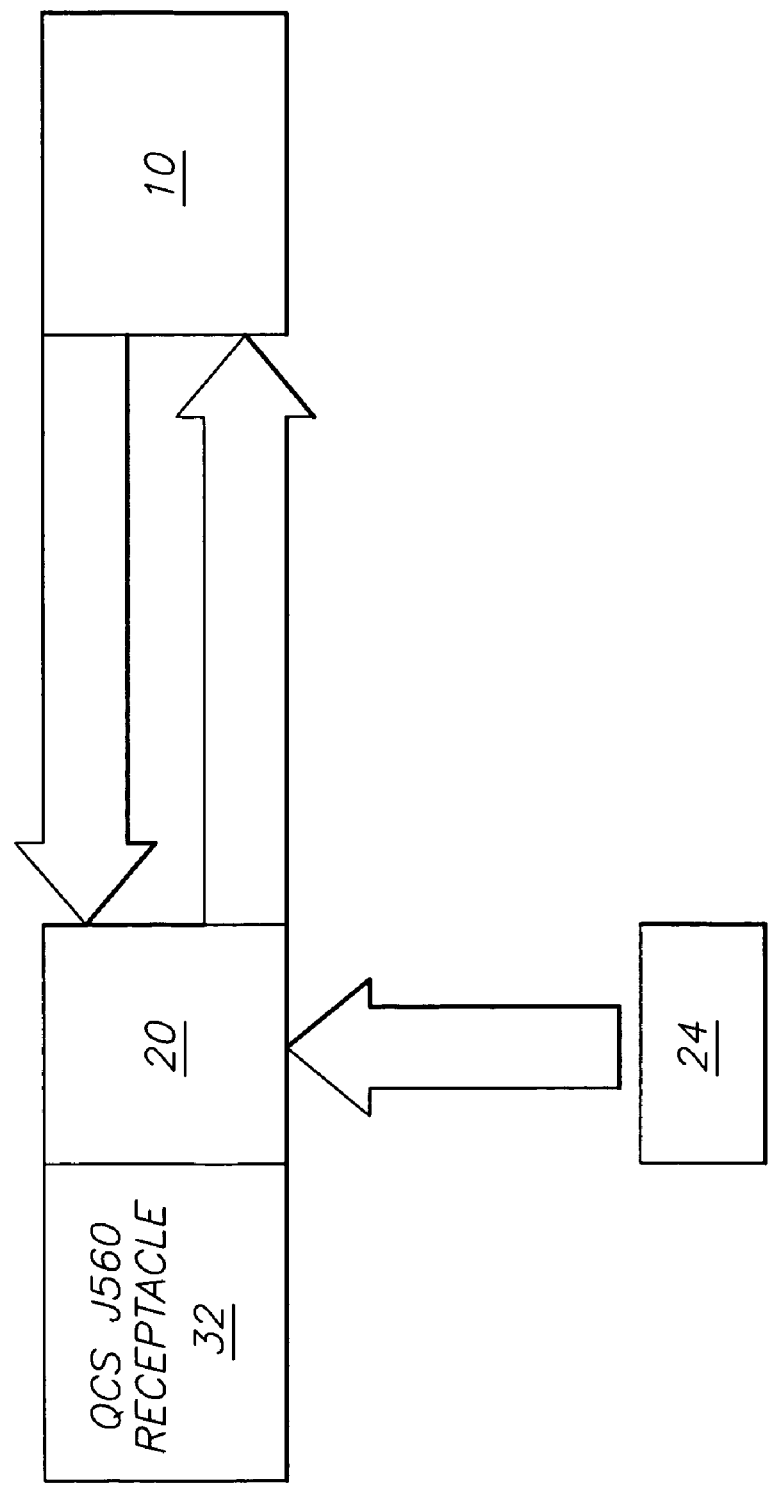
FIG. 3 is a block diagram of an embodiment of the present invention including a multiplex decoder.

The power distribution unit 20 operates as follows, as shown schematically in FIG. 3. A control signal may enter the power distribution unit 20 relay bank from a remote location on the tractor, such as when a driver applies a brake or activates a turn signal. When the control signal reaches the corresponding actuator 30 (FIG. 5), the actuator activates the corresponding switch 28. Activation of the switch 28 closes the circuit between the power bus 22 and the corresponding output terminal 26 of the unit 20, allowing power from the power source to be supplied directly to the desired output terminal. Additionally, the relay bank 40 may send back a status signal to the signal origin (FIG. 3).

Figure 2:
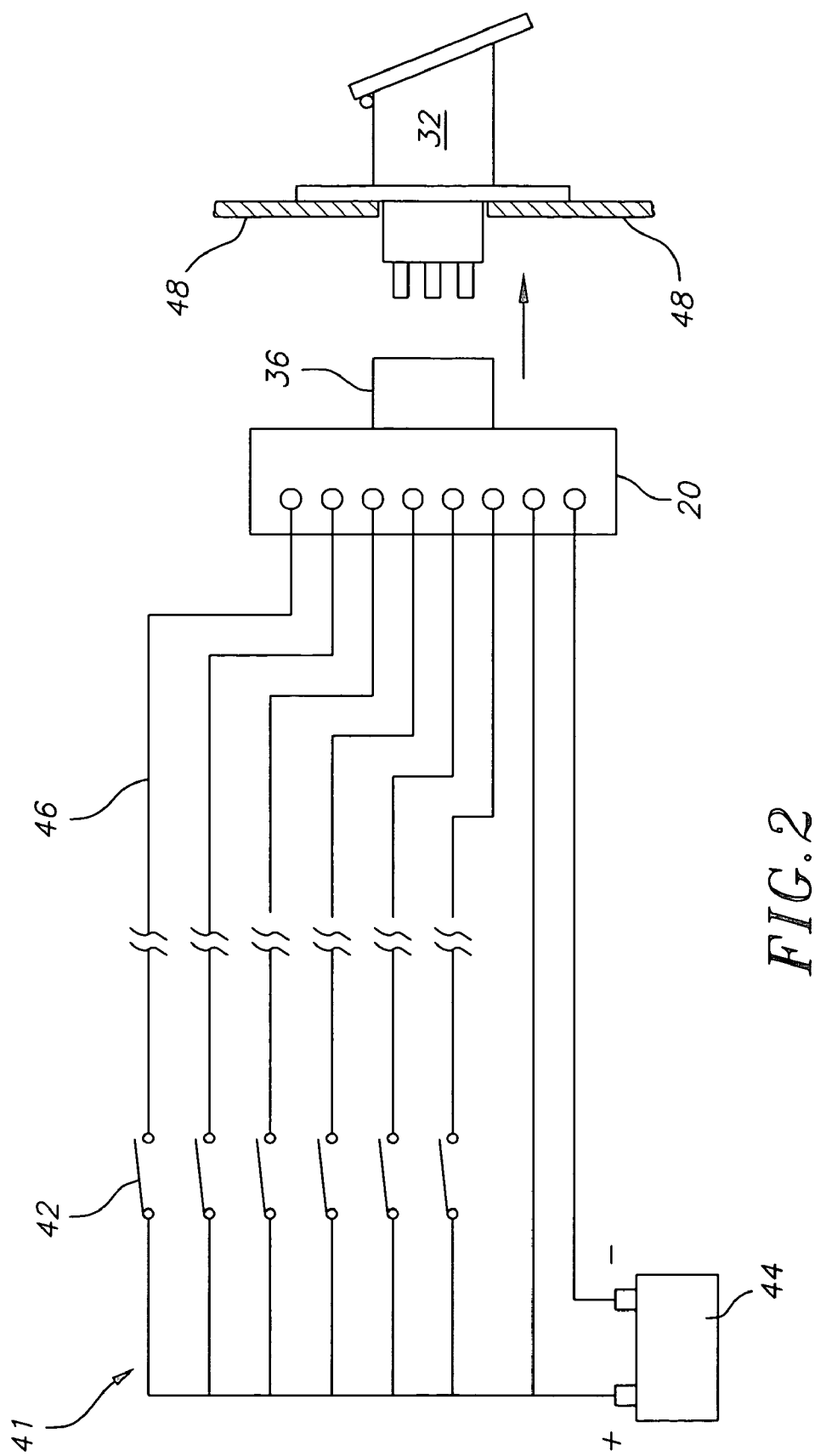
FIG. 2 is a circuit diagram of an embodiment of the present invention showing a power distribution unit and accompanying socket.

FIG. 2 shows a schematic view of function control circuits 41 which are connected to a power source 44, for example, a battery. When an operator triggers a function control switch 42, a control signal is delivered along a signal control line 46 to the power distribution unit 20 described above. It will be appreciated that the length of the control signal lines 46 may be quite extensive and the interruption of the lines in the figure is meant to convey the indefinite length of the lines. FIG. 2 further shows that part of the socket 32 may be located on the interior of the tractor wall 48 and part of the socket may be located on the exterior of the tractor wall.

As shown in FIG. 4, the power distribution unit 20 may be directly connected to the socket 32 if the terminals of unit 20 are defined as terminals of a unit connector 36 configured to be matable with the ends of the terminals of socket 32 which are inside the tractor when the socket is mounted to the tractor, i.e., the rear end of the socket. SAE J560 does not pertain to the rear (inside the tractor) aspects of a socket conforming to that standard. Therefore, the structure of unit connector 36 can be defined as desired consistent with the rear end structure of socket 32. Unit connector 36 can be mounted or affixed to a circuit board to which relays 40 are mounted, so that unit 20 can be mechanically and electrically connected directly to socket 32 within the trailer. However, if desired, the terminal output ends may be connected to the socket by any appropriate means, such as wiring.

As further shown in FIG. 4, multiplex modulation/demodulation (MUX/DEMUX) circuitry 38 may be mounted onto or in the power distribution unit 20. This circuitry 38 allows multiple unit command signals to be transmitted to unit 20 along a single line and may be used, for example, if there is a large distance between the signal origin and the power distribution unit 20.

A harness end connector can be replaced by a switching controller (power distribution unit) as described above and as shown more fully in the block, schematic and board layout drawings described above. The electrical connections to the controllers are simple and easier to manipulate than the harness cable (see FIG. 3) now commonly used.

The overall dimensions of the housing for the switching controller can be on the order of about 8.5 inches by 5.5 inches by 1.5 inches. The relays of the controller preferably are solid state relays mounted on a circuit board to which a seven-terminal female connector receptacle (matable with the terminals exposed on the interior portion of a J560 socket) also can be mounted. Multiplex modulation/demodulation (MUX/DEMUX) circuitry also can be mounted on that circuit board in association with an externally accessible connection to a multiplex signal bus. A separate control signal input terminal for each relay also may be accessible at the exterior of the controller housing.

What is claimed is:

1. A power distribution unit useful in a truck tractor to apply electrical power to a selected one or more of a plurality of signal terminals of a tractor-mounted connector in a tractor-to-trailer electrical connection, the power distribution unit comprising a power bus adapted for connection to a power source, an output terminal corresponding to each signal terminal of the connector, a switch connected between each output terminal and the power bus, and an actuator associated with each switch and operable upon receipt of a respective control signal to operate the associated switch.

2. A power distribution unit according to claim 1 in which each switch and associated actuator comprise a relay operable by a respective control signal.

3. A power distribution unit according to claim 1 wherein at least one control signal can be generated at a location remote from the unit.

4. A power distribution unit according to claim 1 including in the unit a multiplex decoder operable to generate at least two of the control signals.

5. A power distribution unit according to claim 1 including a common terminal connectible to the power source and connected in the unit to a common output terminal associated with the switched output terminals.

6. A power distribution unit according to claim 5 in which the power source is a battery.

7. A power distribution unit according to claim 1 in which the connector is a socket conforming to SAE J560.

8. A power distribution unit according to claim 7 in which the signal terminals are components of the socket and have ends accessible inside the tractor, and the power distribution unit includes a second connector matable with the signal terminal ends, whereby each signal terminal can be energized by closure of the corresponding switch in the unit.

9. In a heavy duty truck tractor having a first multi-terminal electrical connector mounted in a rear wall of the tractor and cooperable with a second mating connector at an end of a multi-wire cable extendible to a trailer coupled to the tractor, the improvement comprising a power distribution unit in the tractor in association with the first connector and operable for supplying tractor battery power essentially directly to selected ones of the first connector terminals when desired, the power distribution unit comprising a power bus connected directly to the battery, a respective switch connected between the power bus and each one of the selected first connector terminals, each switch having an actuator, each actuator being a component of a respective control circuit powered by the battery and operable to generate an actuator command signal when it is desired to supply battery power to the respective selected one of the first connector terminals, and a common connection from the battery to a further terminal of the first connector.

10. The combination of claim 9 in which the first connector is a socket.

11. The combination of claim 10 in which the socket conforms to SAE J560 and has six signal terminals defining the selected first connector terminals and a common terminal defining the further terminal of the first connector.

12. The combination of claim 11 in which each switch actuator is a component of the respective control circuit.

13. The combination of claim 9 in which each switch is a component of a relay.

14. The combination of claim 9 in which the connection of the switches and the common connection to the terminals of the first connector comprises a third connector matable with the first connector inside the tractor.

* * * * *